United States Patent [19]
Weirich et al.

[11] 4,074,695
[45] Feb. 21, 1978

[54] PRESSURE-RELIEF VALVE DEVICES

[75] Inventors: Walter Weirich, Dortmund; Willy Kussel, Lunen, both of Germany

[73] Assignee: Gewerkschaft Eisenhutte Westphalia, Westphalia, Germany

[21] Appl. No.: 658,624

[22] Filed: Feb. 17, 1976

[30] Foreign Application Priority Data

Feb. 19, 1975 Germany .............................. 2506928

[51] Int. Cl.² ............................................ F16K 31/12
[52] U.S. Cl. .................................... 137/508; 137/542; 137/543.23
[58] Field of Search .................... 137/508, 540, 543.23, 137/542; 251/368

[56] References Cited
U.S. PATENT DOCUMENTS

| 2,090,688 | 8/1937 | Lindberg | 137/543.23 X |
| 3,398,551 | 8/1968 | Yaumascoli | 137/508 X |
| 3,524,469 | 8/1970 | Jebe | 251/368 X |
| 3,583,431 | 6/1971 | Diel | 137/508 X |

FOREIGN PATENT DOCUMENTS

| 588,544 | 11/1933 | Germany | 137/540 |
| 899,122 | 6/1962 | United Kingdom | 137/508 |

Primary Examiner—Harold W. Weakley
Attorney, Agent, or Firm—Thompson, Birch, Gauthier & Samuels

[57] ABSTRACT

A pressure-relief valve device has a housing with bores for admitting and discharging pressure fluid. The fluid admitted to the housing passes via a hollow member or sleeve to a valve inlet. The sleeve has at its upper end a chamfered seating surface for engaging with a sealing surface of a valve member and these surfaces form the valve. The valve member has a head with the sealing surface at its periphery and a stem which is guided within the sleeve. The stem is axially and circumferentially grooved to allow pressure fluid to pass through the housing to flush dirt away from the valve inlet even while the valve is closed. Opposed spring forces bias the surfaces of the valve together and a stop member limits the movement of the sleeve. The spring or springs acting on the valve member engage on a support member and this support member engages via a punctiform contact with a thrust piece. The support member and thrust piece are guided within a bore in the stop member and the thrust piece protrudes from this bore to engage over the entire end face of the head of the valve member.

13 Claims, 1 Drawing Figure

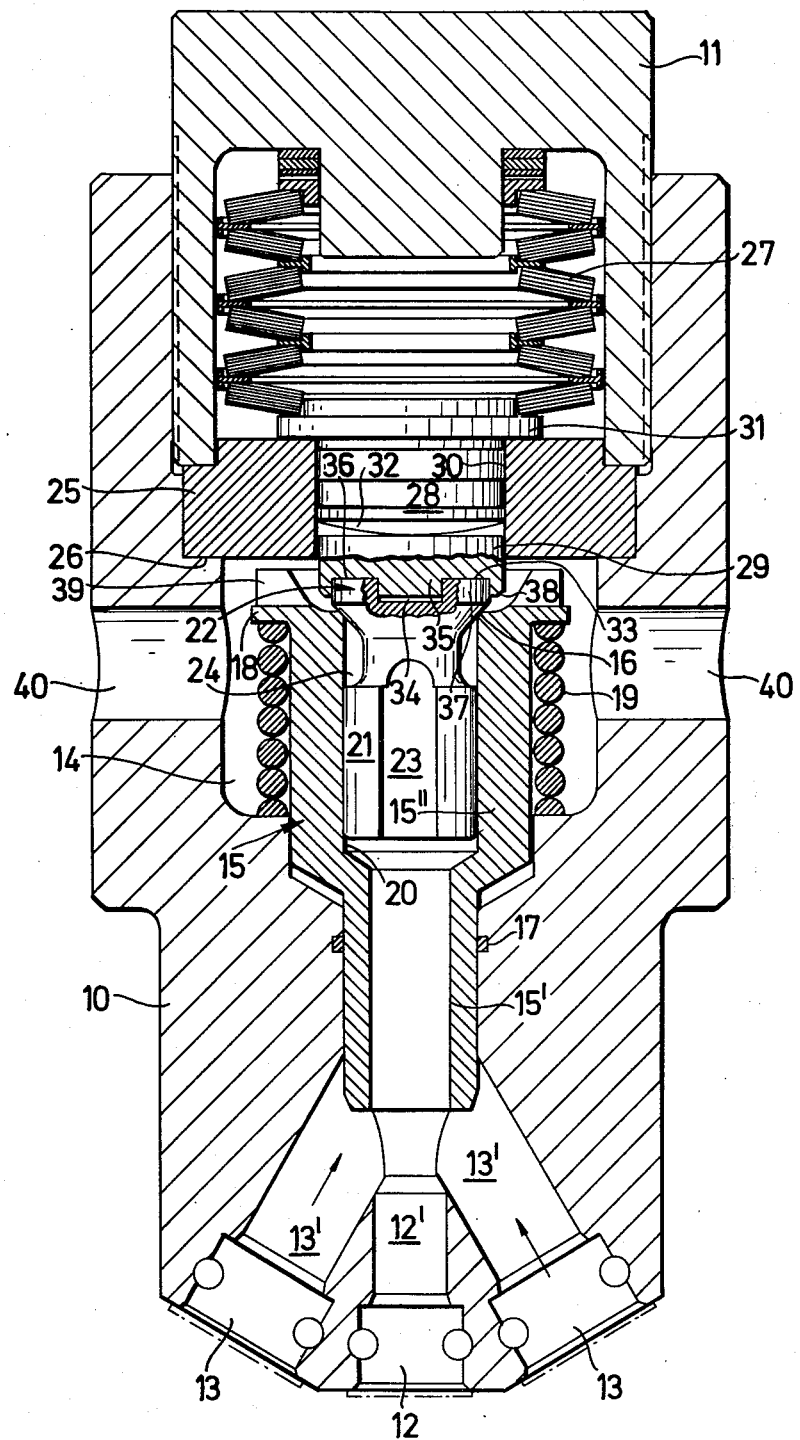

PRESSURE-RELIEF VALVE DEVICES

BACKGROUND TO THE INVENTION

The present invention relates to a pressure-relief valve device particularly, but not solely, for use with fluid-operated apparatus such as support props in mine workings.

Known forms of pressure-relief valve devices for use in mining employ a closure element such as a ball engaging on a valve seating under the action of a spring which maintains the valve closed unless a pre-determined pressure acts on the inlet of the valve to displace the closure element against the closure force. In one type of valve device described in German patent specification 1216057 the valve closure element is a shaped component with a conical sealing surface engaging on a seating formed at one end of a hollow sleeve in which a part of the closure element is guided.

The closing force is then applied to one end of this closure element by means of a piston-like thrust piece mounted in a bore and subjected to the force of the spring.

In order to accurately locate and support the components and to provide for a centralized application of the closure force to the closure element the necessary contact between the thrust piece and the closure element is essentially punctiform and this is achieved by having one of the mating surfaces convex. As a result of this arrangement the closure element is subjected to very high forces over a small area and this can lead to wear even over a short period of operation. Furthermore when the valve is opened and the guidance of the closure element in the sleeve is not so effective deformation can occur. A further disadvantage of this, and other known types of valve device, is that the valve surfaces, i.e. of the closure element and its seating, are usually subjected to wear due to particles and foreign matter impurities present in the hydraulic pressure fluid. Indeed in most cases the valves only open when some unusual condition produces a rise in the pressure of the fluid and hence over the long periods when the valves are closed a relatively large accumulation of dirt can occur which could affect the operation of the valve as well as produce high wear.

A general object of this invention is to provide an improved form of valve device.

SUMMARY OF THE INVENTION

According to the invention there is provided a pressure-relief valve device comprising a housing containing a hollow member provided with a valve seating surface, the hollow member being guided for displacement in relation to the housing, a valve closure member guided for displacement within the hollow member, the valve closure member having a complementary sealing surface engageable with the seating surface to effect closure of the valve constituted thereby, there being a pressure fluid path through the hollow member to the inlet of the valve and means in the housing permitting fluid discharge from the valve outlet, stop means for limiting movement of the hollow member in one direction, at least one spring for providing a force to the valve which urges the surfaces together to bias the valve into a closed condition, the closure force being opposed, during use, by a force proportional to the pressure of the fluid at the valve inlet and means for transmitting the closure force through a bore to one end of the valve closure member, said force transmitting means being in face-to-face contact with said one end of the valve closure member over an extended area. Because the force transmitting means engages with the valve closure member over an extended area the high pressures produced with the known punctiform contact and its attendant problems are avoided. A valve device made in accordance with the invention can thus avoid the problems of adverse water and guidance so that operational reliability can be improved.

Preferably the force transmitting means is in face-to-face contact with the entire end face of said one end of the valve closure member and also engages on a peripheral lateral surface of the valve closure member. This peripheral surface may adjoin and be adjacent to the sealing surface of the valve closure member.

Preferably the valve closure member is of one-piece construction made from synthetic plastics. This member may have a head provided externally with the sealing surface and said end engaging with the force transmitting means and a stem guided within the hollow member.

The stem of the valve closure member is preferably provided with axial grooves for transmitting pressure fluid to a peripheral groove adjoining the sealing surface of the member. The application of the closure force to as large an area of the closure member as possible ensures that deformation of the member when the valve is opened cannot occur even when the peripheral groove, which has to transmit as much fluid as possible, has a large cross section thus potentially weakening the juncture between the stem and the head of the member.

In order to support the contacting surfaces of the closure member and the force transmitting means laterally and to provide accurate location it is desirable to provide these surfaces with interengaging projections and recesses. In one specific form the end of the closure member is provided with a central recess which receives a projection of the force transmitting means and an annular projection surrounding the central recess which engages in an annular groove surrounding the projection of the force transmittng means. Of course this arrangement could be reversed with the central recess provided on the force transmitting means.

Preferably the force transmitting means is of multi-part construction. Thus this means may comprise a support member subjected to the force of the spring and a separate thrust piece which engages on the support member within said bore and which engages on said one end of the valve closure member.

The engagement between the thrust piece and the support member can be a punctiform contact since this ensures accurate centralized transmission of the closure force. Since the engaging surfaces, which can be planar and convex, are located in the bore no problems exist as to deformation or guidance and indeed the support member does not need especially accurate guidance. The hollow member and the thrust piece, at least, are made from metal.

It is convenient to have the bore through which the closure force is transmitted in the stop means which can take the form of a ring clamped into the housing. The closure force can be provided by a stack of dish springs located in a cap screwed into one end of the housing. It is desirable to bias the hollow member towards these springs with the aid of a further spring so that the surfaces of the valves are subjected to a resilient force in both directions.

Preferably the housing is provided with bores adapted for connection to a source of pressure fluid and to the pressure chamber of a hydraulic prop and wherein these bores in the housing communicate with the interior of the hollow member and thence with the valve inlet.

By providing a plurality of such bores the largest possible through flow of fluid can be achieved without increasing the size of the housing. The means permitting outflow from the valve outlet may similarly be in the form of a number of bores open to atmosphere.

Furthermore by effectively connecting the source of fluid to the appliance, e.g. the pressure chamber of the prop, via the hollow member and hence the valve inlet, any accumulation or deposit of dirt particles will tend to be flushed away, thus avoiding the problems hitherto encountered in this regard.

The invention may be understood more readily and various other features of the invention may become more apparent from consideration of the following description.

BRIEF DESCRIPTION OF DRAWINGS

An embodiment of the invention will now be described, by way of example only, with reference to the accompanying drawing which is a sectional side view of a valve device made in accordance with the invention.

DESCRIPTION OF PREFERRED EMBODIMENTS

The valve device depicted in the drawing is particularly intended for use with hydraulic props in underground mine workings. As shown the valve device has a main housing 10 which is closed off at its upper end with a detachable cap 11 screw-threaded into a bore at the upper end part of the housing 10. This screw-threaded bore is coaxial with a stepped passageway 14 extending longitudinally through the centre of the housing 10. This stepped passageway 14 has a number of axial portions which progressively widen in cross-section towards the upper end of the housing 10. At the lower end part of the housing 10 there are bores 12′, 13′ communicating with the central passageway 14. The bore 12′ is coaxial with the passageway 14 whereas the bores 13′ are inclined in relation thereto as depicted. Each bore 12′, 13′ has an outer terminal end section of wider cross-section forming a recess provided with a seal and constituting a female connector 12, 13 for receiving a male connector on the end of a hose or the like.

The lower portion of the passageway 13 which adjoins the bores 12′, 13′ widens into a second short portion with inclined shoulders and this second portion in turn widens into a central or main portion which has fluid-escape bores 40 communicating therewith. These bores 40 extend laterally of the housing 10 as shown. The passageway 14 receives a sleeve 15 forming a valve seating member which is slidable longitudinally of the passageway 14. More particularly, this sleeve 15 slidably engages on the walls of the lower and second portions of the passageway 14. A seal or packing 17 is accommodated in a groove in the lower portion of the passageway 14 and engages on the lower narrow part 15′ of the sleeve 15. The sleeve 15 is shaped to correspond with the lower and second portions of the passageway 14 and the inclined shoulder therebetween. The sleeve 15 has its widest upper part 15″ located within the main portion of the passageway 14. At the upper end of the part 15″ of the sleeve 15 there is an outwardly projecting flange 18 and at the upper edge of the internal opening 20 of the part 15″ the sleeve 15 is formed with a chamfered surface 16 which forms a seating surface for a valve member 22. The valve member 22 is preferably a one-piece component which has a head portion which is partly frusto-conical with an inclined surface engageable on the surface 16 in sealing relationship as shown. The valve member 22 has a stem 21 depending from the head portion and slidably engaging within the opening 20 of the upper part 15″ of the sleeve 15. This stem 21 is provided with several axial grooves 23 which extend from the lower end of the stem 21 and communicate with a peripheral groove 24 located between the frusto-conical part of the head portion of the member 22 and the stem 21.

A compression spring 19 surrounds the upper part 15″ of the sleeve 15 and engages on the lower face of the flange 18 and on a shoulder at the lower end of the main central portion of the stepped passageway 14. Thus the spring 19 serves to bias the sleeve 15 in the upward direction. The main central portion of the passageway 14 adjoins a further wider portion which in turn adjoins the screw-threaded bore receiving the cap 11. This further portion of the passageway 14 has a lower shoulder 26 and a stop ring 25 is located within this further portion to rest on the shoulder 26. The upper face of this ring has a recess which receives the lower end of the cap 11 so that the cap 11 can be screwed into the housing 10 to secure the ring 25. The flanged upper end of the sleeve 15 is formed with an annular projection 39 which has an upper abutment face for engagement with the lower face of the ring 25.

The cap 11 is hollow and is formed internally with a central spigot which locates a stack of dished springs denoted 27 which bear on an upper abutment collar 31 of a piston-like support member in the form of a sleeve 28 engaging within the central bore 30 of the ring 25. The lower end of the sleeve 28 terminates in the bore 30 and has a convex end surface 32. A thrust piece in the form of a cylindrical plug 29 is also located in the bore 30 with minimal clearance and has an upper face engaging on the lower convex surface 32 of the sleeve 28. This plug 29 projects downwardly into a central recess of the sleeve 15 and has a groove or recess 36 in its lower end which receives an annular projection 37 at the upper end 33 of the valve member 22. The plug 29 also has a central projection 35 which engages in a recess 34 in the end of the valve member 22. There is minimal clearance between the interengaging projection and recess 35, 34 and a slight clearance between the interengaging projection and recess 36, 37. The support member 28 and the thrust piece 29 serve to transmit the force of the springs 27 to the valve member 22 to maintain the sealing relationship of the latter in respect of the seating surface 16. The plug 29 has a collar 38 defined by the recess 36 which engages on the outer periphery 38 of the head of the member 22 to support the latter. The head of the member 22 is thus supported by the plug 29 over its entire end face and periphery. The convex lower surface 32 of the sleeve 28 ensures that the thrust force of the springs 27 is transmitted centrally to the plug 29 and there is no need for a close tolerance clearance between the bore 30 and the sleeve 28. The interengaging grooves and projections 34, 35, 36, 37 and the arrangement of the plug 29 and the sleeve 28 in the bore, providing accurate longitudinal guidance, transmit axial forces without any appreciable transverse movement. The stem 21 locating in the sleeve 15 also serves to support and guide the member 22 from the opposite end. The member 22 is preferably made from a wear-resistant synthetic plastics material and at least the housing 10, the sleeve 15 and the thrust piece 29 are preferably made from metal.

The operation of the valve device is as follows: During use, the connectors 13 are connected via hoses or the like with the pressure chamber of a hydraulic support prop whereas the connector 12 is connected to the pressure fluid supply line. Upon actuation of a control valve (not shown) pressure fluid is admitted to the connector 12 and the fluid discharges through the connectors 13 to the pressure chamber of the prop so that the latter extends and becomes set. The fluid passed through the valve device will enter the sleeve 15 and will flow along the grooves 23, 24 in the valve member 22. This is advantageous since any particles or foreign matter will be flushed away from these spaces and will hence not interfere with the sealing of the member 22 on the seating surface 16. The valve constituted by the seating surface 16 and the corresponding surface of the head of the valve member 22 is closed and these surfaces are biased together resiliently under the opposing forces of the springs 27, 29. This also tends to reduce the wear on these surfaces. Should the pressure in the pressure chamber of the prop rise continuously beyond a pre-determined value the sleeve 15 and the member 22 will first tend to move upwardly against the force of the springs 27. This motion will continue until the projection 39 engages on the ring 25 thus restricting further movement of the sleeve 15. Thereafter the member 22 will move axially of the sleeve 15 to lift the conical portion of the head of the member 22 off the seating surface 16. The guidance of the member 22 is maintained by the thrust piece 29. As soon as the valve constituted by the sealing surface 16 and the associated surface of the head of the member 22 opens the fluid can discharge from the connectors 13 through the interior of the sleeve 15 and the grooves 23, 24 into the main portion of the passageway 14 and thence out through the bores 40. Thus the pressure is relieved and thereafter the force of the springs 27 will overcome the prevailing pressure to restore the sealing of the valve. The member 22 and the sleeve 15 will then move back again against the force of the spring 19 to reestablish the former condition.

We claim:

1. A pressure-relief valve device comprising:
   (a) a housing provided with conduit means for admitting hydraulic pressure fluid into the housing, and conduit means for discharging hydraulic pressure fluid from the housing;
   (b) a hollow member disposed in the housing and guided and sealed for displacement therein, the hollow member being provided with a valve seating surface;
   (c) a valve closure member having a portion thereof guided by the hollow member for displacement therein, the valve closure member having a complementary sealing surface engageable on the seating surface of the hollow member to effect closure of the valve constituted by the two surfaces, the valve closure member having channel means communicating through the interior of the hollow member with the admitting conduit means of the housing to permit pressure fluid to reach the inlet side of the valve, and the valve having an outlet side which communicates with the discharging conduit means of the housing;
   (d) stop means for limiting movement of the hollow member in one direction as the hollow member is displaced by the pressure of the fluid admitted by the admitting conduit means;
   (e) plural spring means for providing a force to the valve to urge the two surfaces thereof together to thereby bias the valve into a closed condition, the plural spring means being composed of first spring means acting on the hollow member to bias the hollow member in said one direction, and second spring means acting on the valve closure member in the opposite direction;
   (f) means for transmitting force from the second spring means to the valve closure member utilizing a pair of surfaces at least one of which is non-planar so that the surfaces engage one another over a zone aligned centrally of the sealing surface of the valve closure member, said transmitting means including a thrust member in face-to-face contact with one end of the valve closure member remote from the guided portion thereof, said contact being over an extended area; and
   (g) guide means for guiding said thrust member for axial movement centrally of the sealing surface of the valve closure member.

2. A device according to claim 1, wherein the force transmitting means further comprises a support member subjected to the force of the second spring means, the thrust member and the support member having said pair of engaging surfaces which engage one another within the guide means.

3. A device according to claim 2, wherein the pair of surfaces effecting engagement between the thrust member and the support member comprise a convex surface contacting a planar surface.

4. A device according to claim 1, wherein the guide means of the force transmitting means is in the form of a bore provided in the stop means which is clamped in the housing.

5. A device according to claim 1, wherein the valve closure member has a one-piece construction made from a synthetic plastic material, the valve closure member comprising a head provided externally with the sealing surface, said one end of the valve closure member engaging with the thrust member of the force transmitting means, and a stem provided with the portion guided for displacement in the hollow member.

6. A device according to claim 1, wherein the thrust member is in face-to-face contact with the entire end face of said one end of the valve closure member.

7. A device according to claim 1, wherein the thrust member also engages on a peripheral side surface of the valve closure member.

8. A device according to claim 1, wherein the thrust member and said one end of the valve closure member are provided with interengaging projections and recesses.

9. A device according to claim 5, wherein the channel means permitting pressure fluid to reach the inlet side of the valve via the interior of the hollow member comprises axial grooves in the stem of the valve closure member and a peripheral groove adjoining the sealing surface on the head of the valve closure member and communicating with said axial grooves.

10. A device according to claim 9, wherein the hollow member has a first portion provided with a bore of a constant cross section guiding the stem of the valve closure member, with the sealing surface being in the form of a chamfered surface at the end of said bore, the first portion being provided with an outwardly directed flange and wherein said first spring means is a compression spring which engages on the flange and biases the hollow member towards the stop member.

11. A device according to claim 1, wherein the means for admitting pressure fluid into the housing comprises bores for connection to a source of pressure fluid, the housing also having a bore for connection to a fluid-operated apparatus, said bores all communicating with the interior of the hollow member.

12. A device according to claim 1, wherein the second spring means is a stack of dished springs located within a cap detachably secured to the housing.

13. In a pressure relief valve device which includes a housing with conduit means for receiving pressure fluid and conduit means for discharging said fluid for relief; a hollow plunger member guided for movement in the housing and limited by stop means when subjected to the pressure of the fluid at the receiving means, the hollow plunger member being sealed exteriorly to the housing in respect of the receiving and the discharging means; and a valve closure member having a head and a stem, the stem of the valve closure member being received in the hollow plunger member, and the head of the valve closure member having a sealing surface which engages with a seating surface of the hollow plunger member to form therewith a valve which opens against spring restoring force to establish communication between the receiving and the discharging means through the interior of the hollow plunger member when excess pressure occurs; the improvement therein comprising:
 (a) the stem of the valve closure member being grooved to establish fluid communication between the interior of the hollow plunger member and the valve inlet;
 (b) spring means biasing the hollow plunger member and the valve closure member towards the stop means in the same direction as that traveled by the valve closure member under pressure of the fluid received at the valve inlet;
 (c) the stop means having a bore which is coaxial with and which is aligned with the direction of movement of the hollow plunger member and the valve closure member;
 (d) further spring means being located on the side of the stop means remote from the hollow plunger member; and
 (e) first and second components serving to transmit thrust from said further spring means to the valve closure member, said first and second components being located by the bore in the stop means, said thrust components engaging each other by interaction of their curvilinear and planar facing surfaces which contact each other over a central zone which is coincidental with the axis of the bore, on of said thrust components engaging substantially the entire end face of the head of the valve closure member adjacent the sealing surface thereof.

* * * * *